United States Patent [19]

Lazarre

[11] Patent Number: 4,508,354

[45] Date of Patent: Apr. 2, 1985

[54] MOVING PISTON WITH SELF-TIGHTENING SEALING RING

[75] Inventor: Flavien Lazarre, Pau, France

[73] Assignee: Societe Nationale Elf Aquitaine, Courbevoie, France

[21] Appl. No.: 590,860

[22] Filed: Mar. 19, 1984

[30] Foreign Application Priority Data

Mar. 21, 1983 [FR] France .................. 83 04570

[51] Int. Cl.³ .............................................. F16J 1/06
[52] U.S. Cl. ........................................ 277/27; 92/202; 92/205
[58] Field of Search ............... 92/202, 205, 247, 244; 277/3, 27, 216

[56] References Cited

U.S. PATENT DOCUMENTS

| 48,098 | 6/1865 | Rowe | 92/205 |
|---|---|---|---|
| 1,523,986 | 1/1925 | Schmidt | 92/205 |
| 2,266,691 | 12/1941 | Mercier | 92/244 |
| 3,916,771 | 11/1975 | Niendzig | 277/27 |
| 4,009,645 | 3/1977 | Freimuth | 92/202 |
| 4,079,948 | 3/1978 | Paureau | 277/27 |
| 4,226,169 | 10/1980 | Mtzur et al. | 92/205 |

FOREIGN PATENT DOCUMENTS 112458 8/1980 Japan ..................... 92/205

Primary Examiner—Robert I. Smith
Attorney, Agent, or Firm—Brisebois & Kruger

[57] ABSTRACT

Packing or sealing moving in a hollow cylinder.

Such a device, or moving piston with self-tightening ring, comprises two elements of cylindrical external outline such as a cylindrical rod integral with the first element slides in a cylindrical chamber delimited inside a second element and facing the first element, the two elements being separated by an annular ring that ensures the packing or sealing with the internal wall of the cylinder.

Such a piston allows to suppress use of mercury as pressure transmission agent.

4 Claims, 2 Drawing Figures

MOVING PISTON WITH SELF-TIGHTENING SEALING RING

BACKGROUND OF THE INVENTION

The present invention concerns a packing or sealing device moving in a hollow cylinder.

DESCRIPTION OF THE PRIOR ART

Moving pistons ensuring packing and separation of the fluids on both sides are known. Inlet bed samplers produced by various manufacturers such as described on page 461 of the "Revue de L'institut Français de Pétrole"—May–June 1975 (8), and the device for measuring the physical characteristics of a liquid described in French Pat. No. 2 480 941 in the name of l'Institut Français du Pétrole and ARMINES can be cited.

The common characteristic of these free pistons is to comprise annular packings or sealing rings made of fluorine-containing rubber. This material is both deformable and non compressible and it ensures the sealing in the annular space surrounding the piston until wear alters in an appreciable way its dimensions or until an accidental rip or tear establishes communication between the two faces. It must be noted that beyond a certain pressure value, these rings no longer ensure even initial sealing and that this value is a function of the hardness of the rubber, thus of its composition and its processing, likely to vary in time due to the temperature or to chemical agents.

In these free pistons, with annular packings or sealing rings such as toric rings, Teflon is not used, since this material, under the pressure effect creeps, in a non reversible way. Whereas, in the case of an annular packing, the internal pressure in the packing is substantially equal to the hydrostatic pressure itself, when mounted, according to the invention, the pressure exerted on the Teflon is equal to the hydrostatic pressure multiplied by the ratio of the section of the piston/section of the ring itself. This internal pressure is thus much higher than the hydrostatic pressure and as a consequence the Teflon behaves like a liquid. Due to this fact, the sealing is ensured that much more completely as the hydrostatic pressure is higher.

The annular packings in fluorine-containing rubber have, furthermore, over those made of Teflon, the drawback of presenting a coefficient of friction on the wall much more considerable in function of the nature of the fluids in contact.

The present invention allows to overcome these difficulties by realizing a self tightening packing or sealing ring made of Teflon combining the advantages of the very low coefficient of friction of this material and of allowing the putting under pressure of the said material by internal mechanical means belonging to the sealing ring itself.

A packing device 1 moving in a hollow cylinder 2, according to the invention, comprises two elements 3 and 4 of cylindrical external outlines, of dimensions slightly smaller than those of the hollow cylinder 2, in order that a cylindrical rod 5 extending the first element 3 slides in a cylindrical chamber 6 delimited inside the second element and facing the first element, each of the two elements 3 and 4 being in contact through an annular part 7 and 8 with an annular packing 9 made of Teflon or analog, through which passes the cylindrical rod 5, this annular packing 9 having substantially the same external diameter as the said elements 3 and 4, when it is not subjected to a compression stress.

In such a device, it is generally observed that one of the two elements comprises a circulation valve having a controlled axial spindle sealingly mounted with a packing-box.

In the various devices, the cylindrical rod 5, extending the first element 3 and sliding in the cylindrical chamber 6 delimited in the second element 4, is provided with a stroke limiting device cooperating with the delimited chamber in the second element.

In order to ensure the various sealing requirements during mounting and the putting under pressure, on the one hand, the cylindrical external outlines of each of the two elements 3 and 4 are, each, provided with an annular sealing ring 18 and 19 and, on the other hand, the cylindrical rod 5 extending the first element slides in the chamber 6, the sealing being ensured by an annular packing 20.

According to a preferred embodiment, the cylindrical chamber delimited in the second element is brought to a pressure much lower than the pressures to which are subsequently brought the spaces situated on both sides of the packing or sealing device.

BRIEF DESCRIPTION OF THE DRAWINGS

The invention will be better understood by reading through the following description, given by way of non-limitative illustration, of the device made with reference to the annexed drawings in which.

SUMMARY OF THE INVENTION

Figure 1:
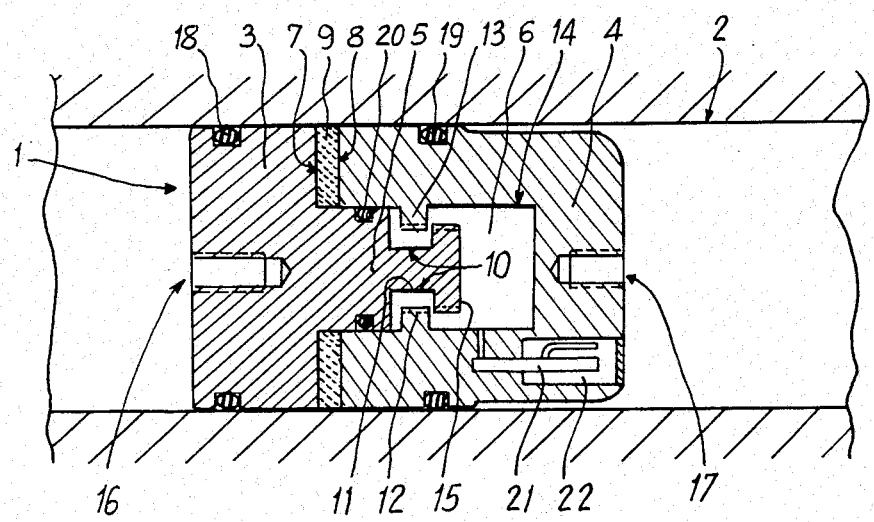
FIG. 1 is a diagram of a moving piston with self tightening packing or sealing ring.

FIG. 1 represents an axial section of a piston 1 moving in a hollow cylinder 2. Such a piston 1 is constituted of two elements 3 and 4 the cylindrical external outlines of which have external dimensions slightly smaller than those of the hollow cylinder and sach that a cylindrical rod 5 extending the first element 3 slides in a cylindrical chamber 6 delimited inside the second element 4 and facing the first element 3.

Each of the two elements 3 and 4 is in contact through an annular part 7 and 8 with an annular packing 9 made of Teflon or analog, through which passes the cylindrical rod 5. This annular packing 9 has substantially the same external diameter as the elements 3 and 4, when it is not subject to a compression strain.

The cylindrical rod 5, extending the first element 3 and sliding in the cylindrical chamber 6 delimited in the second element 4 is provided with a stroke limiting device 10 constituted by an annular grove 11 into which penetrate at least two fingers 12 and 13 integral with the internal wall 14 of the cylindrical chamber 6.

The difference between the width of the groove 11 and the fingers 12 and 13 corresponds to the stroke of the piston.

The rod 5 is limited beyond the annular groove 11 by an annular part 15 comprising as many notches as there are fingers 12 and 13, these notches, or slots (not represented) being of such dimensions and in such positions that for a determined position of the first element 3 rotating with respect to the second element 4, the fingers such as 12 and 13 pass through the notches or slots. This disposition constitutes known means for assembling and disconnecting elements 3 and 4.

Each of these elements 3 and 4 comprises on its external face a threaded hole 16 and 17 used to screw in a threaded rod (not represented), to be used in combination with the gripping means for positioning, mounting and dismounting the piston.

Such a threading 16 or 17 can act to fix a rod (not represented on the drawing), for example, of INVAR metal in order to prevent thermal dilatation, the end of which rod can be seen in the extension, outside the hollow cylinder 2, the sealing being there ensured by a packing-box. It is thus possible to dispose of means for determining the site and displacements of the piston.

The cylindrical external outline of each of the elements 3 and 4 comprises an annular groove 18, 19, in which is housed a toric ring, of the same reference ensuring a preliminary packing or sealing during the putting under pressure.

The external outline of the part of the cylindrical rod 5 that slides in the cylindrical chamber 6 is provided with an annular groove 20 in which is housed a toric ring, of the same reference, ensuring a preliminary sealing or packing during the putting under pressure.

Element 4 is provided with a circulation valve 21 disposed in a recess 22 delimited in the body of the element 4. This valve 21 is represented schematically and enlarged, on FIG. 2.

Figure 2:
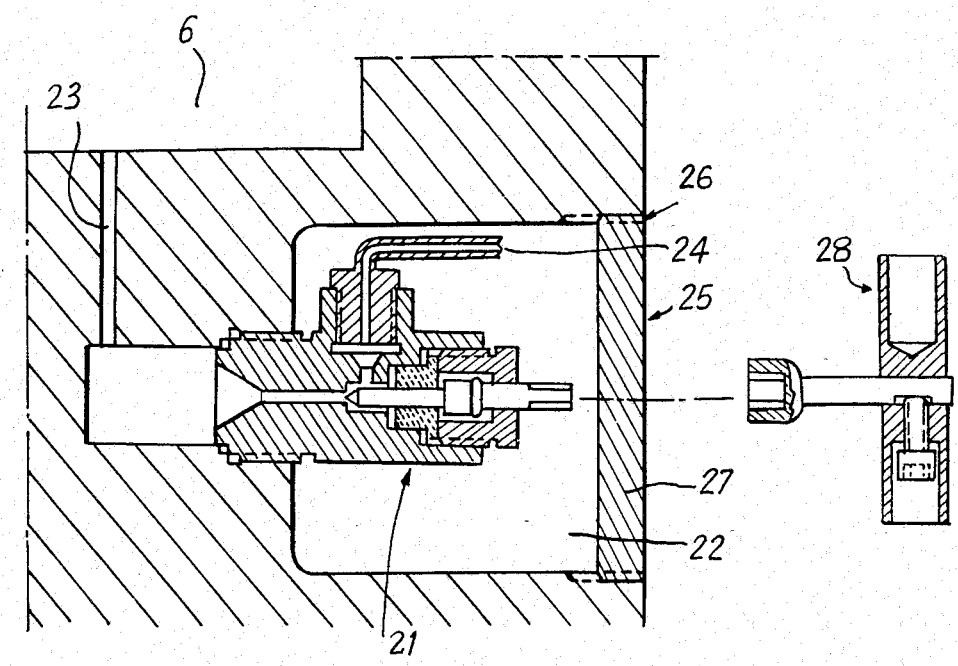
FIG. 2 is a diagram of a circulation valve adapted to the piston.

FIG. 2 represents a circulation valve 21 of a known design, such as was described especially in French Pat. No. 2 398 939 in the name of the applicant and comprises the same elements as those described with references 4 to 22 in French Pat. No. 1 460 865 in the name of the applicant.

This valve 21 allows to connect the recess 6 through the intermediary of the hole 23 with gas transfer means such as a vacuum pump (not represented) through the intermediary of a pipe 24.

The recess issues onto the zone external to the piston by an opening 25 provided with attachment means 26 such as a screw pitch, for a stopper or cover 27 intended to protect the different elements of the valve 21 and the pipe 24.

The stopper 27, if it is impervious, must be adapted so as to support the considerable differences of pressure between the chamber 22 and the space 2; it can also be realized non-impervious, especially with a boring (not represented).

The operating of the moving piston with the self-tightening sealing ring is explained hereunder.

In the preliminary phase of operating the piston, this stopper being removed, the value 21 is provided with a control wheel fixed on the rod of the valve 21 and onto the pipe 24 is screwed a coupling so as to connect this pipe 24 with a vacuum pump (not represented).

This operation, which consists in bringing the recess 6 to a pressure lower than that which will prevail in the hollow cylinder on both sides of the piston during the operational period, is carried out while the piston was introduced into the cylinder and said cylinder is open towards the valve 21 in order to be able to manipulate easily said valve 21.

When the pressure in the recess 6 has been brought to the required value, the valve 21 is shut down, the wheel 28 is dismantled and the coupling of the vacuum pump is disconnected from the pipe 24. The stopper 27 can be put in place and the pipe shut down.

The two elements of the piston are thus applied against each other and exert symetrical stresses on the annular packing or sealing ring 9 made of Teflon. This packing meets the compression stress to which it is subjected and its diameter increases in such a way that it enters into tight contact with the internal wall of the hollow cylinder 2. It thus ensures the sealing or packing of the piston.

The toric rings 18, 19 ensure preliminary sealing or packing during the fitting in place of the piston 1 in the cylinder 2 and thereafter during the putting under pressure. It is useful, but not indispensable to use the rings in such a way that, once mounted, they can be used without the necessity of changing them. On the other hand, the toric ring 5 is indispensable during the entire preparatory phase and remains useful, thereafter, in the case of disconnecting the piston.

Such a piston, used in a laboratory installation such as a device for studying the thermodynamic characteristics of a liquid (PVT), allows to equalize the pressure between the two very dissimilar fluids that it is required to maintain separate. It allows to replace the mercury as pressure transmission agent. Therein resides its considerable advantage since consequently this leads to savings on an expensive product and to reducing the potentiality of professional illnesses for operating staff who, without this, too frequently enter into contact with the mercury.

In a liquid sampling cell comprising a pneumatic balance system such as described with the use of FIG. 1 of French Pat. No. 2 414 194, it is possible to replace the equipment constituted by the enclosure 6, the piston 7 the equilibrium ring 12 and the spring 15, by a self-tightening piston according to the present invention, and it is necessary that the internal space 5 be delimited in the cell 1 by a smooth cylindrical surface. With this disposition, the self-tightening piston separates the fluid carried along by the balance gas by maintaining the pressures equal on both sides. Such equipment is simpler and less heavy than that described in French Pat. No. 2 414 194; this is an appreciable means for transportation of deposit fluid samplers.

I claim:

1. Packing or sealing device moving in a hollow cylinder comprising two elements of cylindrical external outlines of dimensions slightly smaller than those of the hollow cylinder, wherein in order that a cylindrical rod extending the first element slides in a cylindrical chamber delimited inside the second element and facing the first element, each of these two elements are in contact through an annular part with the annular packing or sealing ring, made of Teflon or analog, through which passes the cylindrical rod, this annular packing having substantially the same external diameter as the said elements, when it is not subjected to compression stress.

2. Device, according to claim 1, in which one of the two elements comprises a circulation valve with controlled axial spindle sealingly mounted with a packing-box.

3. Device according to claim 1, in which the cylindrical external outlines of each of the two elements are each provided with an annular sealing ring and in which the cylindrical rod extending the first element slides in the chamber, the packing or sealing being ensured by an annular ring.

4. Device according to claim 1, in which the cylindrical chamber delimited in the second element is brought to a pressure much lower than the pressures to which will be brought the spaces on both sides of the packing device.

* * * * *